(12) United States Patent
Hurley et al.

(10) Patent No.: US 6,901,191 B2
(45) Date of Patent: May 31, 2005

(54) HIGH DENSITY FIBER OPTIC CABLE (75) Inventors: William C. Hurley, Hickory, NC (US); Martyn N. Easton, Lenoir, NC (US)

(73) Assignee: Corning Cable Systems LLC, Hickory, NC (US)

( * ) Notice: Subject to any disclaimer, the term of this patent is extended or adjusted under 35 U.S.C. 154(b) by 186 days.

(21) Appl. No.: 10/005,325

(22) Filed: Nov. 12, 2001

(65) Prior Publication Data

US 2003/0091307 A1 May 15, 2003

(51) Int. Cl.[7] .............................................. G02B 6/44
(52) U.S. Cl. ...................................... 385/109; 385/113
(58) Field of Search .................. 385/109–113, 100–107

(56) References Cited

U.S. PATENT DOCUMENTS

| | | | |
|---|---|---|---|
| 4,682,850 A | * 7/1987 | White et al. ................. | 385/109 |
| 4,684,214 A | * 8/1987 | Goldmann et al. ........ | 385/112 |
| 4,701,016 A | 10/1987 | Gartside, III et al. ..... | 350/96.23 |
| 4,826,278 A | 5/1989 | Gartside, III et al. ..... | 350/96.23 |
| 4,932,746 A | * 6/1990 | Calzolari et al. ........... | 385/112 |
| 5,067,830 A | 11/1991 | McAlpine et al. .......... | 385/114 |
| 5,165,003 A | * 11/1992 | Carter ......................... | 385/112 |
| 5,293,443 A | 3/1994 | Eoll et al. ................... | 385/114 |
| 5,345,526 A | 9/1994 | Blew .......................... | 385/112 |
| 5,379,363 A | 1/1995 | Bonicel et al. ............. | 385/114 |
| 5,422,973 A | 6/1995 | Ferguson et al. ........... | 385/112 |
| 5,561,730 A | * 10/1996 | Lochkovic et al. ........ | 385/114 |
| 5,751,879 A | 5/1998 | Graham et al. ............. | 385/103 |
| 5,838,864 A | 11/1998 | Patel et al. ................. | 385/113 |
| 6,167,178 A | 12/2000 | Nave ........................... | 385/103 |
| 6,185,352 B1 | 2/2001 | Hurley ........................ | 385/114 |
| 6,205,277 B1 | 3/2001 | Mathis et al. ............... | 385/106 |
| 6,256,438 B1 | * 7/2001 | Gimblet ...................... | 385/109 |
| 6,321,012 B1 | 11/2001 | Shen ........................... | 385/106 |
| 6,445,859 B1 | * 9/2002 | Witt ............................ | 385/109 |
| 6,546,175 B1 | * 4/2003 | Wagman et al. ............ | 385/113 |

FOREIGN PATENT DOCUMENTS

| | | | |
|---|---|---|---|
| DE | 3913674 A1 | 10/1990 | .......... G02B/6/44 |
| DE | 19546773 A1 | 12/1995 | .......... H01B/13/26 |
| EP | 0553990 A1 | 8/1993 | .......... G02B/6/44 |
| EP | 1262808 A1 | 12/2002 | .......... G02B/6/44 |
| EP | 1271212 A2 | 1/2003 | .......... G02B/6/44 |

* cited by examiner

*Primary Examiner*—Edward J. Glick
*Assistant Examiner*—Thomas R Artman
(74) *Attorney, Agent, or Firm*—Michael E. Carroll, Jr.

(57) ABSTRACT

A fiber optic cable includes at least one at least one bundle having a plurality of non-tight buffered optical fibers and a binder element for maintaining the integrity of the bundle. The binder element may be, for example, a binder thread. The fiber optic cable may exclude a grease or a grease-like composition being in contact with the at least one bundle for filling interstices of the cable thereby blocking water from flowing through the cable. The fiber optic cable also includes a separation layer for inhibiting adhesion between the bundles of optical fibers and the cable jacket. In another embodiment, a fiber optic cable includes a plurality of optical fibers and a binder element forming at least one bundle. The at least one bundle is surrounded by an armor layer and the fiber optic cable excludes a cable jacket within the armor layer.

28 Claims, 6 Drawing Sheets

HIGH DENSITY FIBER OPTIC CABLE

FIELD OF THE INVENTION

The present invention relates generally to fiber optic cables and, more particularly, to high density fiber optic cables.

BACKGROUND OF THE INVENTION

In many applications, it is desirable for a fiber optic cable to include a plurality of optical fibers. With the increased demand for optical communications, there has been a corresponding demand to increase the number of optical fibers, i.e., the fiber count, of a fiber optic cable. By increasing the fiber count of a fiber optic cable, a single fiber optic cable would be able to support additional optical communications channels.

Figure 1:
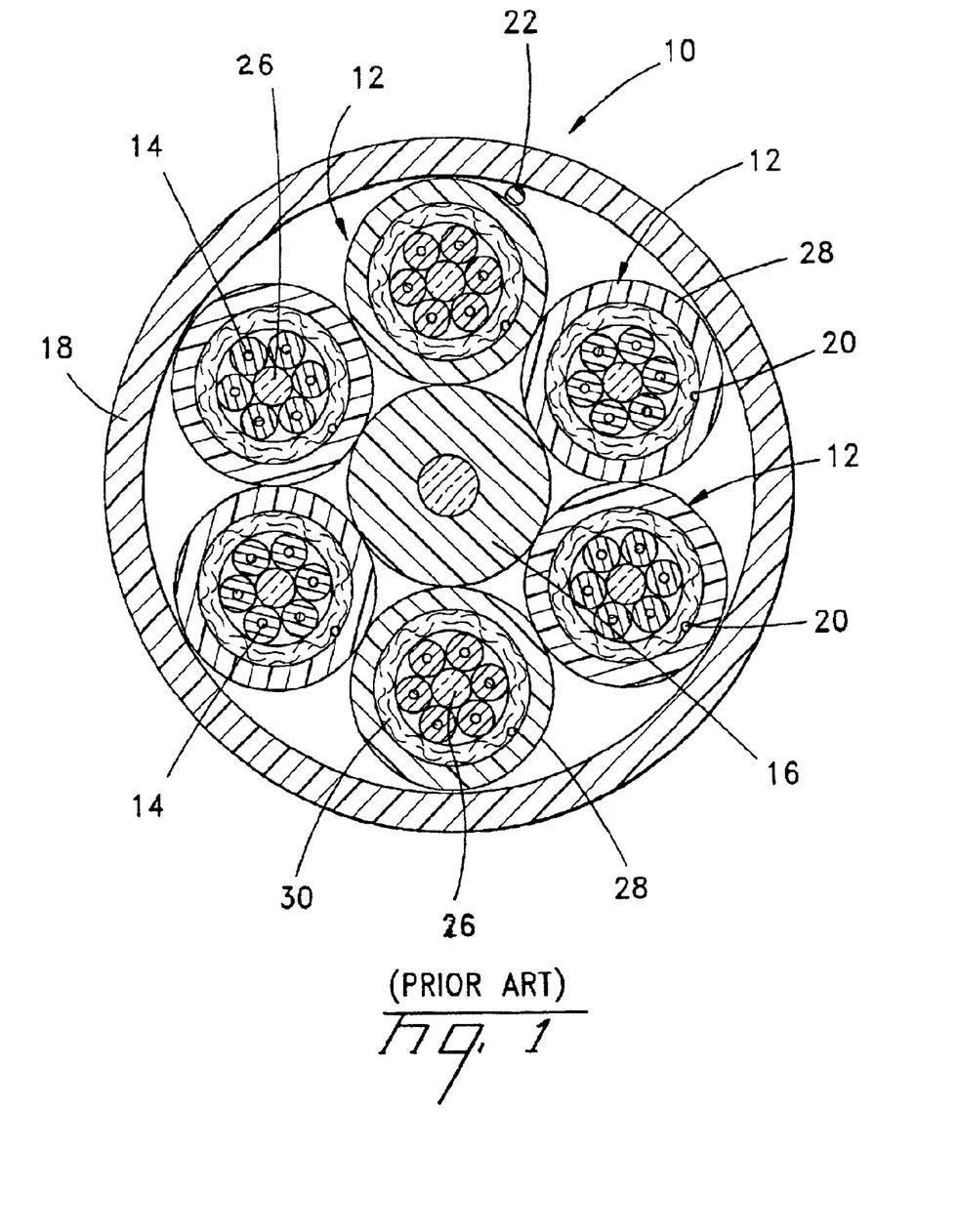
FIG. 1 is a cross-sectional view of a conventional fiber optic cable having a unitized design according to the prior art.

In order to increase the fiber count of fiber optic cables, unitized fiber optic cables have been developed. As shown in FIG. 1, a unitized fiber optic cable 10 includes a number of bundles 12 of optical fibers 14 that are stranded about a common central strength member 16. A unitized fiber optic cable 10 also includes a cable jacket 18 extruded about the bundles 12 of optical fibers 14, and an optional ripcord 22 for facilitating removal of cable jacket 18. As shown in FIG. 1, each bundle 12 of optical fibers 14 includes at least two and, more commonly, six or twelve optical fibers that are stranded together.

Optical fibers 14 are typically tight buffered optical fibers. A tight buffered optical fiber 14 includes a single mode or multi-mode optical fiber that may be surrounded by an interfacial layer. The interfacial layer can be formed of a Teflon® containing material and is surrounded by a tight buffer layer; however, other suitable interfacial layers may be used, for example, an UV acrylate. The tight buffer layer is typically formed of a plastic, such as polyvinyl chloride (PVC). As an alternative to PVC, the tight buffer layer can be formed of a non-halogenated polyolefin, such as a polyethylene or a polypropylene. Still further, the tight buffer layer can be formed of EVA, nylon or polyester.

Each bundle 12 of optical fibers 14 also includes a central strength member 26 about which the plurality of tight buffered optical fibers is stranded. Each bundle 12 of optical fibers 14 further includes a jacket 28 that surrounds the plurality of optical fibers, and an optional ripcord 20 for facilitating removal of jacket 28. Jacket 28 serves to protect optical fibers 14 and to maintain the bundle of optical fibers in a stranded relationship about central strength member 26. Jacket 28 is typically formed of a polymer, such as PVC. As an alternative to PVC, jacket 28 may be formed of a fluoro-plastic, such as polyvinylidene fluoride (PVDF), a fluoro-compound as disclosed by U.S. Pat. No. 4,963,609 or blends of PVC and PVDF or PVC and polyethylene (PE). Jacket 28 is typically relatively thick and, in one embodiment, has a thickness of about 0.8 millimeters.

During fabrication, a bundle 12 of optical fibers 14 is passed through an extruder cross head and jacket 28 is extruded thereabout in order to maintain the optical fibers in position within the bundle. Since the tight buffer layer of the tight buffered optical fibers 14 is typically formed of a plastic, the plastic that is extruded to form jacket 28 will tend to adhere to the tight buffer layer of the tight buffered optical fibers 14 in the absence of a barrier therebetween. In this regard, the plastic that is extruded to form jacket 28 of a bundle 12 of optical fibers 14 may partially melt the outermost portion of the tight buffer layer of the tight buffered optical fibers 14 such that jacket 28 and the tight buffered optical fibers will adhere to one another as the plastic cools. Unfortunately, the adherence of the tight buffered optical fibers 14 to the surrounding jacket 28 generally decreases the performance of the optical fibers. In this regard, signals propagating along optical fibers 14 generally experience greater attenuation as fiber optic cable 10 is bent or flexed in instances in which the tight buffered optical fibers are adhered to jacket 28 since the optical fibers will no longer be free to move relative to jacket 28 in order to accommodate bending or flexure of fiber optic cable 10.

Each bundle 12 of optical fibers 14 therefore also generally includes a barrier 30 disposed between the plurality of tight buffered optical fibers and jacket 28 in order to separate the tight buffered optical fibers from jacket 28 and to prevent adherence therebetween that otherwise would result from the extension of jacket 28 about optical fibers 14. As such, optical fibers 14 can move somewhat relative to jacket 28 as fiber optic cable 10 is flexed. Barrier 30 is typically formed of a layer of strength members, such as aramid yarn, that are typically stranded about the optical fibers. The layer of strength members is also generally relatively thick and may have a thickness of about 0.2 mm in one embodiment.

Each bundle 12 of optical fibers 14 is typically stranded about common central strength member 16 of fiber optic cable 10. Like central strength member 26 of each bundle 12 of optical fibers 14, central strength member 16 of fiber optic cable 10 is typically formed of a relatively stiff fiber or glass reinforced plastic, or a relatively flexible combination of aramid fiber that may or may not be overcoated with a plastic material. Fiber optic cable 10 also includes a protective cable jacket 18 that surrounds each of the bundles 12 of optical fibers 14. Cable jacket 18 is typically formed of a plastic, such as PVC. As an alternative to PVC, cable jacket 18 may be formed of a fluoro-plastic, such as PVDF, a fluoride-compound or blends of PVC and PVDF or PVC and PE.

As described above in conjunction with jacket 28 that surrounds each bundle 12 of optical fibers 14, cable jacket 18 is also typically extruded over the plurality of bundles of optical fibers. As a result of the plastic materials that form cable jacket 18 and the jackets 28 that surround the respective bundles 12 of optical fibers 14, cable jacket 18 and the jackets that surround the respective bundles of optical fibers may also adhere to one another following the extrusion of cable jacket 18 about the bundles of optical fibers. While the adherence of cable jacket 18 to the jackets 28 of the respective bundles 12 of optical fibers 14 does not impair the performance of fiber optic cable 10 as significantly as adherence between jacket 28 of a bundle 12 of optical fibers 14 and the tight buffer layer of the tight buffered optical fibers, the adherence of cable jacket 18 and the jackets of the respective bundles of optical fibers does disadvantageously impair the flexibility of fiber optic cable 10 somewhat.

Accordingly, fiber optic cable 10 can also include a surface coating on at least that portion of the exterior surface of jacket 28 of each bundle 12 of optical fibers 14 that otherwise would be in contact with cable jacket 18. The surface coating is typically formed of powdered talc that serves to prevent or reduce adhesion between cable jacket 18 and the jackets 28 of the respective bundles 12 of optical fibers 14.

Unitized fiber optic cable 10 as depicted in FIG. 1 is generally relatively large. For example, unitized fiber optic cable 10 depicted in FIG. 1 having six bundles 12 of optical fibers 14 stranded about a central strength member 16 with each bundle of optical fibers having six tight buffered optical fibers stranded about a respective strength member 26 generally has a diameter of about 18.8 millimeters. In many applications, it is desirable to minimize the size of fiber optic cable 10 while maintaining or increasing the number of optical fibers 14 within fiber optic cable 10. As such, it would be advantageous to develop a unitized fiber optic cable having a relatively high fiber count while also being somewhat smaller.

SUMMARY OF THE INVENTION

One aspect of the present invention is directed to a fiber optic cable including at least one bundle having a plurality of non-tight buffered optical fibers and a binder element. The binder element maintains the plurality of non-tight buffered optical fibers in the at least one bundle. A separation layer generally surrounds the at least one bundle, and a cable jacket surrounds the separation layer inhibiting adhesion between the at least one bundle and the cable jacket without surrounding each bundle of optical fibers with a respective jacket. The fiber optic cable excludes a grease or a grease-like composition being in contact with the at least one bundle for filling interstices of the cable thereby blocking water from flowing through the cable.

Another aspect of the present invention is directed to a fiber optic cable including at least one bundle having a plurality of non-tight buffered optical fibers and at least one binder thread encircling the plurality of optical fibers to thereby maintain the plurality of optical fibers in the bundle. A separation layer surrounds the at least one bundle, and a cable jacket surrounds the separation layer inhibiting adhesion between the at least one bundle and the cable jacket without surrounding each bundle of optical fibers with a respective jacket. The fiber optic cable excludes a grease or a grease-like composition being in contact with the at least one bundle for filling interstices of the cable thereby blocking water from flowing through the cable.

A further aspect of the present invention is directed to a fiber optic cable including a central member and at least one bundle. The at least one bundle includes a plurality of non-tight buffered optical fibers and a binder element. The binder element maintains the plurality of non-tight buffered optical fibers in the at least one bundle and a cable jacket surrounds the at least one bundle. A separation layer inhibits adhesion between the at least one bundle and the cable jacket. The fiber optic cable excludes a grease or a grease-like composition being in contact with the at least one bundle for filling interstices of the cable thereby blocking water from flowing through the cable.

A still further aspect of the present invention is directed to a fiber optic cable including at least one bundle having a plurality of optical fibers and a binder element. The binder element maintains the plurality of optical fibers in the at least one bundle. An armor layer surrounds the at least one bundle. The fiber optic cable excludes a cable jacket within the armor layer.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
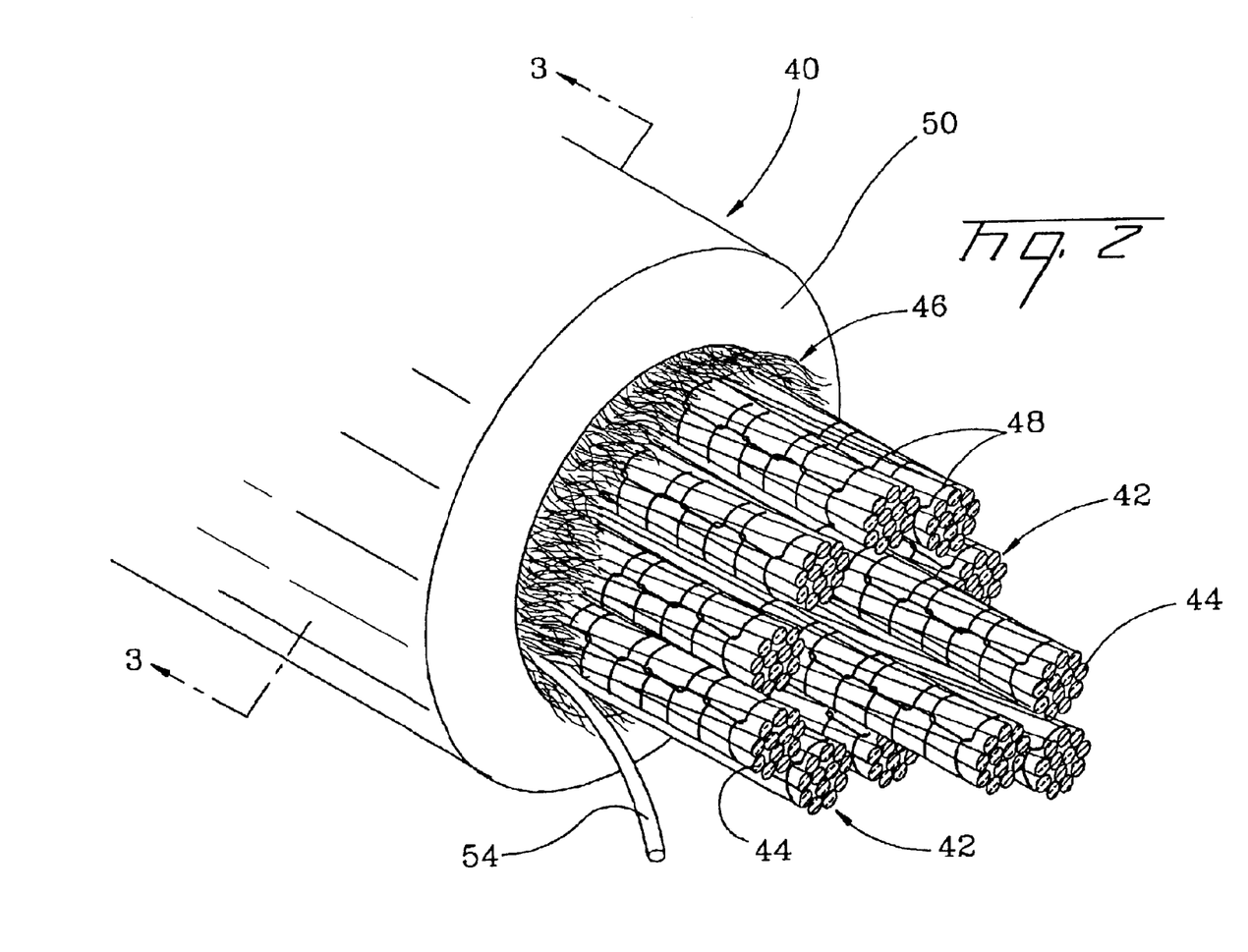
FIG. 2 is fragmentary perspective view of an exemplary fiber optic cable according to one embodiment of the present invention.
Figure 3:
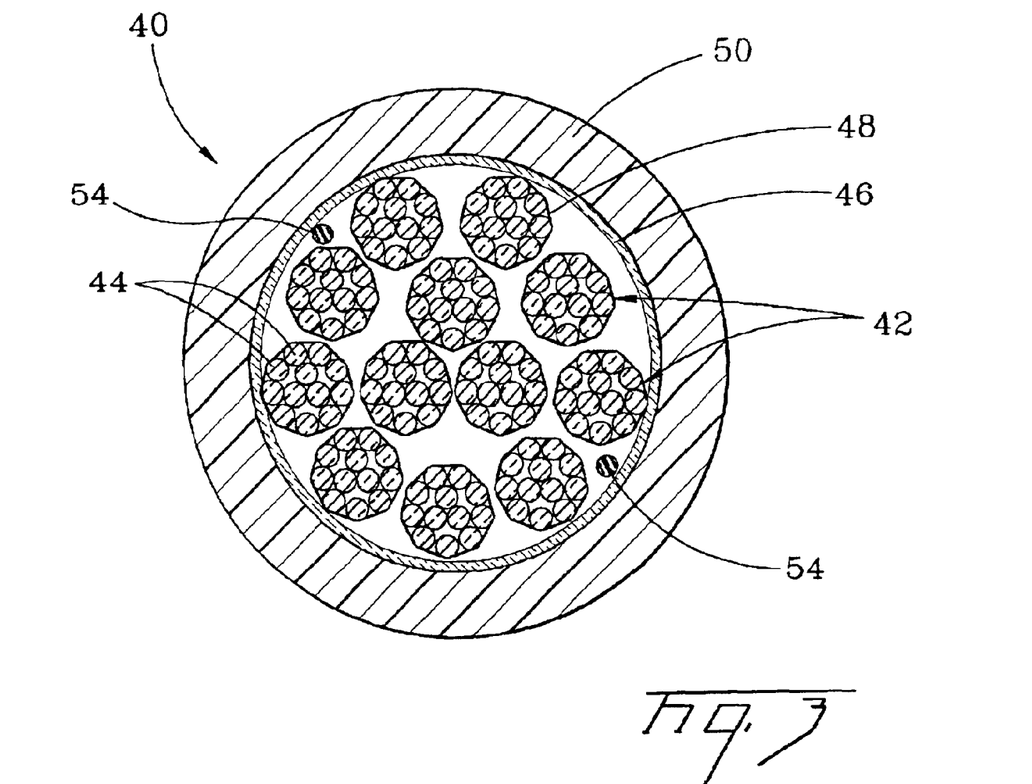
FIG. 3 is a cross-sectional view of the fiber optic cable of FIG. 2.

Referring now to FIGS. 2 and 3, a fiber optic cable 40 according to one embodiment of the present invention is illustrated. Fiber optic cable 40 of the present invention can have other configurations as described below, although the fiber optic cable of FIG. 2 will be described in more detail hereinbelow for purposes of illustration. Fiber optic cable 40 includes at least one bundle 42 having optical fibers 44 that are non-tight buffered; however, optical fibers 44 may be tight-buffered or zipped together. Optical fibers 44 may include, for example, a conventional single mode or multi-mode optical fibers; however, other suitable optical waveguides may be used. Strength members 46 such as an aramid yarns may be disposed around bundle 42; however, in other embodiments a plurality of bundles 42 may be disposed around strength member(s) 46 disposed in the center of cable 40. More particularly, strength members 46 include a plurality of aramid yarns stranded around two layers of bundles 42; however, other suitable strength members may be used, for example, fiberglass yarns. Other embodiments of the present invention may include other suitable layers of bundles 42, bundles 42 within the same cable having different numbers of optical fibers 44, and/or different types of optical waveguides in the same cable. Fiber optic cable 40 also includes a cable jacket 50 that surrounds bundles 42 of optical fibers 44, and an optional ripcord 54 for facilitating removal of cable jacket 50. Additionally, strength members 46 provides a separation layer between optical fibers 44 of bundles 42 and cable jacket 50 inhibiting the extruded cable jacket 50 from sticking to optical fibers 44 and/or bundles 42.

Fiber optic cables of the present invention are of a dry cable design. In other words, bundles 42 of the present invention exclude a grease, or a grease-like composition in contact therewith for filling interstices of the cable thereby blocking water from flowing through interstices of the cable. However, fiber optic cables of the present invention may include lubricants allowing bundles 42 and/or optical fibers 44 to move relative to each other, for example, during bending to improve optical performance. Grease compositions are among other things messy and susceptible to dripping at high temperatures. Moreover, craftsman must clean the grease from the optical fibers before working with the optical fibers which is a time consuming process. On the other hand, dry cables of the present invention allow the craftsman to work with the optical fibers without first cleaning the grease or grease-like compositions from the optical fibers.

Fiber optic cable 40 of FIGS. 2 and 3 has twelve bundles 42 of twelve optical fibers 44 for a 144-fiber count cable having a relatively small diameter. Each bundle 42 may contain twelve different colored optical fibers 44 aiding identification of the optical fibers 44 of each bundle 42 by the craftsman. Optical fibers 44 are non-stranded, but may be stranded. Bundles 42 of the embodiment are arranged in a first layer having three bundles helically stranded, a second layer having nine bundles counter-helically stranded around the first layer and strength members 46 helically stranded around the second layer. In other embodiments, the first layer of bundles 42 may be stranded around a central member that may be a strength member, for example, aramid yarns, a glass reinforced plastic, or fiberglass yarns. In still another embodiment, a filler rod or other suitable filler member may be used rather than a bundle 42 of optical waveguides to form fiber optic cable 40.

However, the concepts of the present invention may include any suitable number of bundles having any suitable number of optical waveguides. For example, fiber optic cable 40 may be configured as: a single layer of three bundles having twelve optical fibers for a 36 optical fiber count cable; a 72 optical fiber count cable having a single layer of six bundles stranded around a strength member; an eight-fiber count interconnect cable; or a 288 optical fiber count cable. The concepts of the present invention may also be practiced with other suitable cable constructions, for example, S-Z stranding or planetary stranding of bundles 42.

Bundles 42 of fiber optic cable 40 include a plurality of non-tight buffered optical fibers 44 allowing direct optical fiber to optical fiber contact among optical fibers 44 and/or bundles 42. However, other embodiments of the present invention may include tight buffered optical fibers 44. By eliminating the tight-buffered layer around optical fiber 44, the cable diameter may be advantageously reduced allowing for a relatively high fiber density. For example, in one embodiment a 144 optical fiber count cable has a diameter of about 10 mm or less. Embodiments including optical fibers 44 with a tight buffer layer generally increase the cable diameter with a corresponding decrease in the optical fiber density. For example, in one embodiment a 144 optical fiber count cable having tight buffered optical fibers 44 has a diameter of about 20 mm or less, whereas a conventional unitized cable construction has a diameter of about 30 mm.

Embodiments that include tight buffered optical fibers 44 may be surrounded by an interfacial layer. The interfacial layer is generally formed of a Teflon® containing material. The interfacial layer therefore serves as a release layer that provides a controlled bond between the tight buffer layer and the optical fiber so that a craftsman can easily strip the tight buffer layer from the optical fiber during a termination procedure. The tight buffer layer is typically a plastic such as PVC. However, the tight buffer layer can be formed of other plastics including non-halogenated polyolefins, such as PE or polypropylene, a fluoro-plastic such as PVDF or an ultraviolet (UV) light curable material. Although not necessary for the practice of the present invention, the tight buffer layer can also be designed to be flame resistant and to have a riser, a plenum and/or a low smoke zero halogen rating as described by U.S. Pat. No. 6,167,178, the subject matter of which is incorporated herein by reference. For example, the tight buffer layer of the tight buffered optical fibers can include aluminum trihydrate, antimony trioxide or other additives to improve the flame resistance of the tight buffer layer.

Each bundle 42 of optical fibers 44 also includes a binder element 48 that encircles the optical fibers to maintain optical fibers 44 in the bundle. In one embodiment depicted in FIGS. 2 and 2A, at least one binder thread 48 encircles the optical fibers 44. Fiber optic cable 40 can include various binder threads 48 or binder yarns. Binder thread 48 is preferably an air-entangled, textured, continuous multi-filament thread. In addition, binder thread 48 may be a synthetic thread that is resistant or impervious to bacterial decomposition that would otherwise create hydrogen which, in turn, may cause undesirable increases in the attenuation of the signals transmitted via optical fibers 44. By way of example, binder thread 48 may be formed of polyester, rayon, nylon or the like. Moreover, binder thread 48 is preferably pre-shrunk.

Figure 2A:
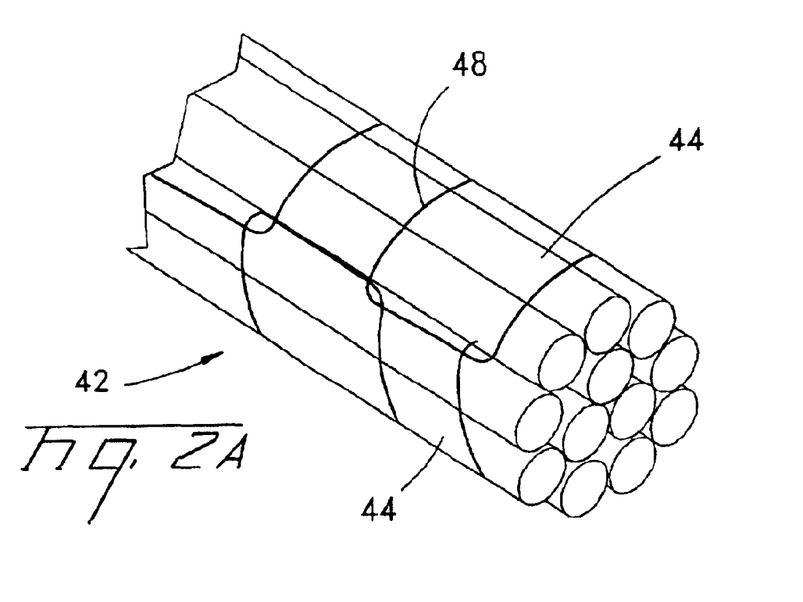
FIG. 2A is fragmentary perspective view of one bundle of optical fibers of the fiber optic cable of FIG. 2.

Binder thread 48 advantageously has a large spread factor and therefore flattens once the binder thread is wrapped about optical fibers 44. Additionally, binder thread 48 may readily deform when subjected to additional forces, such as the forces created by bending fiber optic cable 40. Binder thread 48 typically has no more than about 25 twists per inch in order to avoid undesirable attenuation of the signals transmitted via optical fibers 44. Most commonly, binder thread 48 has between about 2 twists per inch and about 6 twists per inch and, more preferably, about 4 twists per inch. Binder thread 48 also preferably has a TEX number between about 18 and about 60 and, more preferably, between about 30 and about 40 such as about 35 in one embodiment such that the binder thread has a fluffy feel. Additionally, binder thread 48 advantageously has a denier between about 150 and about 2600 such as about 250 in one embodiment.

Binder thread 48 also preferably includes a finish that is inert with respect to the components of fiber optic cable 40 with which the binder thread will come into contact. In this regard, the finish of binder thread 48 is preferably inert with respect to the embodiments having tight buffered optical fibers 44, cable jacket 50 and other suitable cable components and/or materials. For example, binder thread 48 of one advantageous embodiment includes a silicone wax emulsion finish that facilitates processing of the binder thread. Binder thread 48 may also be designed to be non-wicking and/or can include a super-absorbent polymer in order to reduce or prevent water migration through fiber optic cable 40.

Binder thread 48 is typically stranded about a respective bundle 42 of optical fibers 44 in a helical manner with a pitch of between 10 mm and 70 mm and, more preferably, about 50 mm to facilitate fabrication of the bundle of the optical fibers. As illustrated in more detail in FIG. 2A, binder thread 48 of one advantageous embodiment includes a pair of threads, namely, a looper thread and a needle thread. As illustrated, one thread, which could be either the looper thread or the needle thread, alternately passes back and forth over the upper portion of bundle 42, while the other thread alternately passes back and forth under the lower portion of the bundle. With reference to the embodiment of FIG. 2A, and for purposes of example, the leftmost thread at the end of the bundle that is illustrated extends lengthwise along the bundle to a first stitch at which point the threads are secured by means of an overlooked stitch. The thread then helically encircles the lower portion of the bundle to a second overlooked stitch on the far side of the illustrated bundle at which point the threads are again secured to one another. The thread then extends lengthwise along the far side of the bundle to a third overlooked stitch before again helically encircling the lower portion of the bundle to a fourth overlocked stitch. This pattern is repeated for each thread along the length of the bundle in order to secure optical fibers 44 together in an integral manner. In this embodiment, the looper thread and the needle thread are typically secured to one another at a plurality of stitch locations along the length of the bundle of optical fibers, typically at a pitch of 10 mm to 70 mm and, more preferably, at a pitch of 50 mm, by means of an overlooked stitch. The resulting binder thread has a zig-zag appearance and is therefore sometimes termed a zig-zag binder.

Further, binder thread 48 can include indicia, such as an identification marking or a color, in order to identify the respective bundle of optical fibers encircled by the binder thread and to distinguish one bundle from another. For example, one white binder thread 48 may be used with a set of twelve different colored binder threads 48 identifying twelve bundles 42; however, two sets of twelve different colored binder threads 48 may be used to identify a plurality of bundles 42.

Binder thread 48 securely maintains the plurality of optical fibers 44 within bundle 42, while also maintaining the shape and size of the bundle of optical fibers such that the optical fibers need not be disposed within a respective jacket or buffer tube as required by conventional fiber optic cables. By eliminating the jacket or buffer tube in which a bundle of optical fibers were traditionally disposed, the resulting bundle of optical fibers and, in turn, fiber optic cable 40, can be reduced in size relative to a conventional fiber optic cable having the same number of optical fibers. Moreover, binder thread 48 inhibits optical fibers 44 from being entangled with, for example, aramid fibers.

Figure 4:
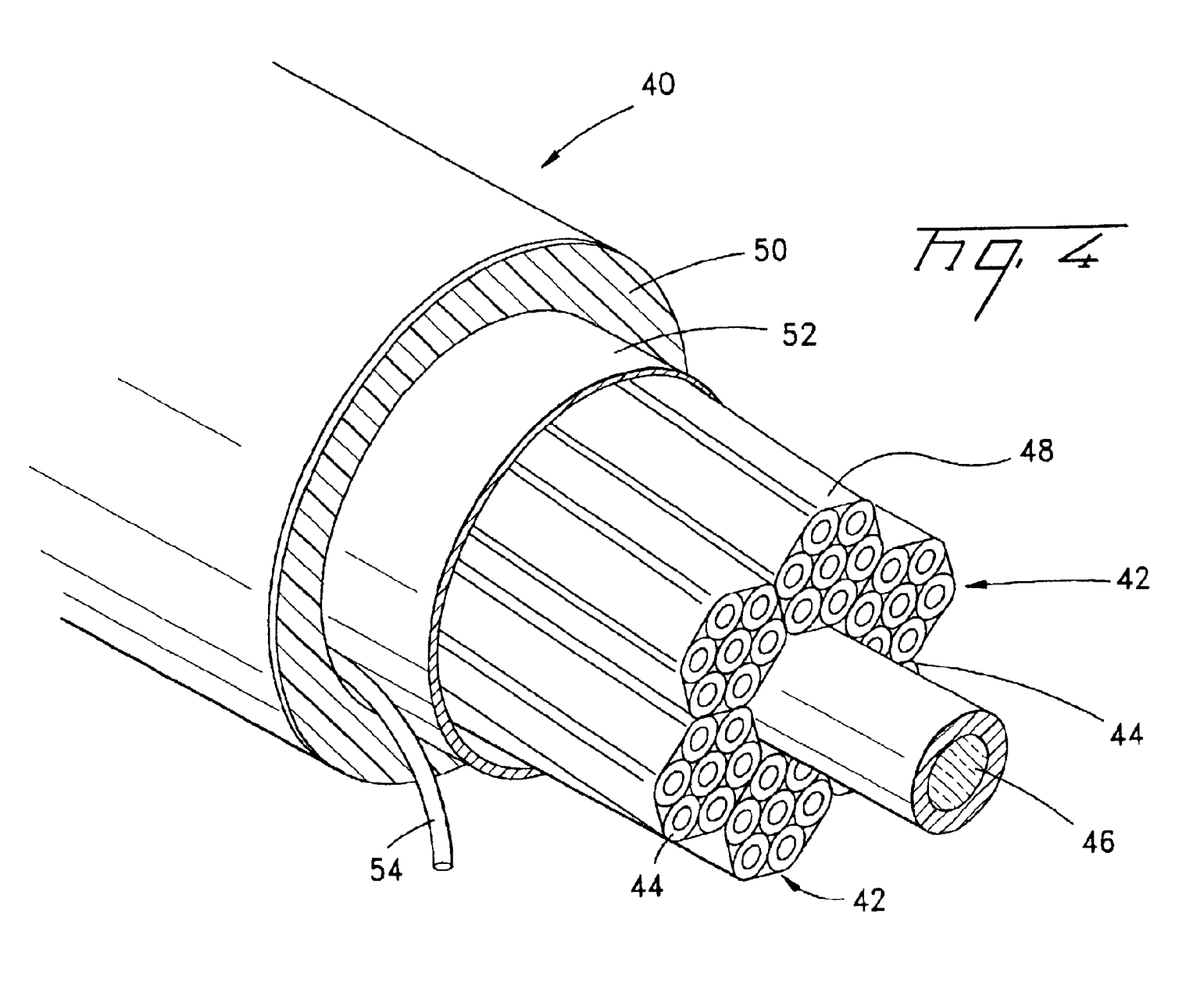
FIG. 4 is a fragmentary perspective view of an exemplary fiber optic cable according to another embodiment of the present invention.

While a binder thread, such as those described above are advantageous for maintaining optical fibers 44 in a bundle 42, each bundle of optical fibers can include other types of binders, if so desired. For example, binder element 48 may be formed of a tape or a film, such as a polymer film, that is wrapped about optical fibers 44 as depicted in FIG. 4. In contrast to the polymer jackets that surround the individual bundles of optical fibers of conventional unitized fiber optic cables, the polymer film is generally quite thin, such as between about 1 mil and 10 mils in one embodiment. Additionally, since the polymer film can be wrapped about the bundle 42 of optical fibers 44 and need not be extruded, the polymer film can be wrapped directly about the optical fibers and no barrier is required between the polymer film and the optical fibers since the polymer film will not adhere to the tight buffer layer and/or optical fiber in the same manner that an extruded polymeric jacket would adhere to the tight buffer layer of the tight buffered optical fibers of a conventional unitized fiber optic cable. Although the polymer film can be formed of various materials, the polymer film of one embodiment is formed of polyester, such as a polyethylene terephthalate, having a thickness of about 1 mil. For example, the polymer film may be a MYLAR® film having indicia, for example, different colors to identify different bundles 42. Additionally, bundle 42 may also be disposed within a soft housing such as disclosed in U.S. patent application Ser. No. 09/966,646 filed on Sep. 28, 2001, which is incorporated herein by reference.

Cable jacket 50 can be formed of various materials, but is typically formed of a plastic, such as PVC. As an alternative to the PVC, cable jacket 50 may be formed of other plastics including fiber-reinforced polyethylene, a fluoro-plastic, such as PVDF, a fluoro-compound as disclosed by U.S. Pat. No. 4,963,609, blends of PVC and PVDF, blends of PVC and PE, or other suitable polymeric blends. As described above in conjunction with the tight buffer layer of the tight buffered optical fibers 44, cable jacket 50 can also be designed to have increased flame resistance such that the fiber optic cable has a riser, a plenum and/or a low smoke zero halogen rating. In this regard, cable jacket 50 can include aluminum trihydrate, antimony trioxide or other additives that increase the flame resistance of the cable jacket as known to those skilled in the art and as described by U.S. Pat. No. 6,167,178. Additionally, cable jacket 50 can be designed to be resistant to UV light, if so desired.

Cable jacket 50 is typically extruded about the plurality of bundles 42 of optical fibers 44. Since bundles 42 of optical fibers 44 need not be jacketed as described below, fiber optic cable 40 preferably includes a separation element and/or layer 52 (FIG. 4) for inhibiting adhesion between the plurality of bundles of optical fibers and cable jacket 50. Separation element 52 includes a separation layer disposed within cable jacket 50 and surrounding the plurality of bundles 42 of optical fibers 44. Separation layer 52 is preferably formed of a material having a melting point that is greater than the respective melting point(s) of cable jacket 50 and, if used, the tight buffer layer of the tight buffered optical fibers 44 in order to inhibit adherence between cable jacket 50 and the bundles of optical fibers. For a cable jacket 50 formed of PVC having a melting temperature of 190° C., separation element 52 can be formed of a polyester, such as a MYLAR® film having a melting point of about 235° C.

Cable jacket 50 is typically extruded about the plurality of bundles 42 of optical fibers 44 at the melting temperature of the plastic that forms the cable jacket. By being formed of a material, such as a polyester, having a melting point greater than the melting point of the plastic that forms cable jacket 50, separation layer 52 does not melt as cable jacket 50 is extruded thereover. As such, separation layer 52 inhibits adherence between cable jacket 50 and the bundles 42 of optical fibers 44 such that the optical fibers are able to move somewhat relative to cable jacket 50 as fiber optic cable 10 is flexed or bent, thereby permitting optical signals to be transmitted via the optical fibers without disadvantageous optical attenuation as fiber optic cable 10 is bent or flexed.

As shown in FIG. 2, strength members 46, for example an aramid yarn such as Kevlar®, at least partially performs as separation layer 52 while providing tensile strength to fiber optic cable 40. However, other suitable strength members 46 may be used, for example, Zylon®, Vectran®, Technora®, or Spectra®. Strength members 46 may have a parallel direction of lay relative to bundles 42 of optical fibers 44 or may be stranded about bundles 42. However, in order to reduce the quantity of aramid yarns used for coverage, rather than strength, separation layer 52 can be formed of various other tapes, films, threads and/or fibrous materials. For example, separation layer 52 can be formed from a plurality of Kevlar® ends and a plurality of polyester yarn ends stranded around a bundle 44. In each of these embodiments, however, separation layer 52 is designed to inhibit adhesion between the plurality of bundles 42 of optical fibers 44 and cable jacket 50. Moreover, separation layer 52 of each of these embodiments is generally relatively thin so as not to unnecessarily increase the size of fiber optic cable 40.

Separation layer 52 can be formed of other, non-polymeric materials, if so desired. For example, separation layer 52 can be formed of a water swellable tape in order to increase the water resistance of fiber optic cable 40. Additionally, a separation layer 52 may be formed of a MYLAR® film having a thickness of about 1 mil.

Separation element 52 can be formed in other manners without departing from the spirit and scope of the present invention. For example, in the embodiment of fiber optic cable 40 depicted in FIG. 4, each bundle 42 of optical fibers 44 includes a polymer film 48 surrounding the plurality of tight buffered optical fibers 44; however, optical fibers 44 may be non-tight buffered. By appropriately designing polymer film 48, polymer film 48 not only serves as the binder for the respective bundle 42 of optical fibers 44, but also serves as the separation element. In this regard, polymer film 48 is preferably formed of a material having a melting point greater than the melting point of the plastic that forms cable jacket 50. For example, for a fiber optic cable 40 having a cable jacket 50 formed of PVC having a melting point of 190° C., polymer film 48 can be formed of a polyester, such as a MYLAR® film, having a melting point of 235° C. As such, the polymer film 48 surrounding each bundle 42 of optical fibers 44 will not melt as cable jacket 50 is extruded about the plurality of bundles of optical fibers. Thus, polymer film 48 will serve to inhibit adhesion between cable jacket 50 and the plurality of tight buffered optical fibers 44 of each bundle 42.

Still further, separation element 52 can be formed of a surface coating on each bundle 42 of optical fibers 44. In this regard, the surface coating is preferably applied to at least that portion of each bundle 42 of optical fibers 44 that would otherwise contact cable jacket 50. The surface coating is preferably formed of a material that also has a melting point greater than the melting point of the plastic from which cable jacket 50 is formed. For example, the surface coating may be formed of powdered talc that is applied to the outer surface of the plurality of bundles 42 of optical fibers 44. The surface coating of talc effectively inhibits adhesion between cable jacket 50 and the tight buffered optical fibers 44 as the cable jacket is extruded thereover.

According to one embodiment of the present invention, each individual bundle 42 of optical fibers 44 is unjacketed. That is, each individual bundle 42 of optical fibers 44 is bound together by a binder element 48, such as a binder thread, a thin polymeric layer or the like, and does not include a polymeric jacket as in conventional unitized fiber optic cables. As such, those embodiments of fiber optic cable 40 in which each bundle 42 is bound with a binder thread 48 permit direct contact between the non-tight buffered optical fibers and/or tight buffered optical fibers of adjacent bundles.

The jackets surrounding the bundles of optical fibers of conventional unitized fiber optic cables are relatively thick. Likewise, the layer of strength members, tight buffering, or the like disposed between the jacket of each individual bundle of optical fibers and the optical fibers is also relatively thick. By designing fiber optic cable 40 such that the bundles 42 of optical fibers 44 need not include a polymeric jacket and/or a layer of strength members for separating the optical fibers from the polymeric jacket, each bundle of optical fibers can be substantially reduced in size and, correspondingly, fiber optic cable 40 can be substantially reduced in size. Likewise, non-tight buffered optical fibers 44 can substantially reduce bundle size and, correspondingly, fiber optic cable 40 can be substantially reduced in size.

For comparison purposes, fiber optic cable 40 according to one embodiment of the present invention has six bundles 42 of optical fibers 44 with each bundle of optical fibers including six tight buffered optical fibers stranded about a central strength member 46. While the size and thickness of various cable components may be varied depending upon the application, such as by varying the thickness of cable jacket 50 to alter the crush and impact resistance and/or the flame retardance, fiber optic cable 40 of one embodiment also includes a separation layer 52 of a polyester, such as a MYLAR® film surrounding the bundles 42 of optical fibers 44 and a cable jacket 50 having a thickness of 1.3 millimeters surrounding the separation layer such that fiber optic cable 40 has a total diameter of 10.9 millimeters. As described above, a conventional unitized fiber optic cable having the same number of bundles and the same number of total optical fibers generally has a diameter that is substantially larger, such as 18.8 millimeters. As such, the conventional fiber optic cable has a cross-sectional area that is about three times larger than the fiber optic cable according to the foregoing exemplary embodiment. Thus, fiber optic cable 40 of the present invention can include the same number of optical fibers 44 while being much smaller than conventional fiber optic cables. Alternatively, fiber optic cable 40 can include a greater number of optical fibers, i.e., a higher fiber count, while having the same size as a conventional fiber optic cable.

While various embodiments of fiber optic cable 40 have been described above, fiber optic cable 40 can include other features without departing from the spirit and scope of the present invention. For example, fiber optic cable 40 can be constructed to have increased water resistance by including a variety of water swellable tapes, threads and/or powders. For example, separation layer 52 can be formed of a water swellable tape as described above. In another embodiment, separation layer 52 can be formed from by an armor layer, for example, a metal or dielectric layer that may be formed from one or more pieces. In addition to acting as a separation layer, an armor layer may provide, for example, crush resistance and/or tensile strength. In yet another embodiment, bundles 42 of optical fibers 44 may be stranded around an electrical component, for example, a coaxial cable or other suitable electrical components.

While one unitized design of fiber optic cable 40 has been described hereinabove, fiber optic cable 40 may have other configurations. In this regard, the embodiment of fiber optic cable 40 depicted in FIG. 2 includes a plurality of bundles 42 of optical fibers 44 having strength members 46 and surrounded by cable jacket 50. However, in other embodiments fiber optic cable 40 can include a number of tube assemblies surrounded by cable jacket 50 with each tube assembly including multiple bundles of optical fibers. In order to minimize the size of each tube assembly required to contain a predetermined number of optical fibers; however, each bundle of optical fibers of a tube assembly is preferably non-jacketed as described above in conjunction with the embodiment of FIGS. 2 and 3.

Figure 5:
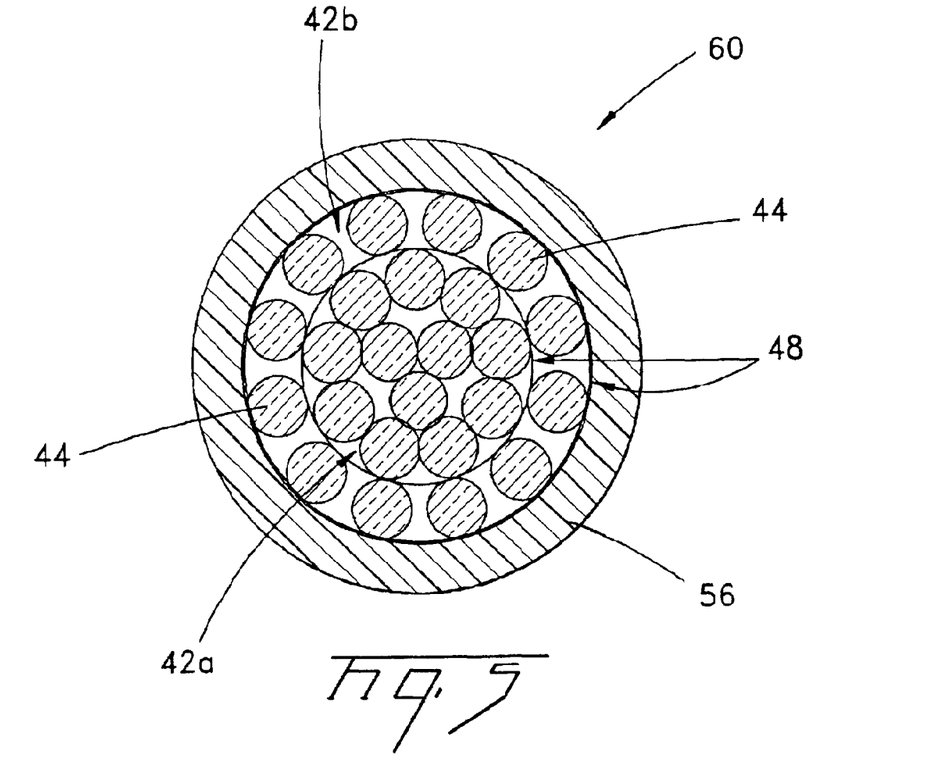
FIG. 5 is a cross-sectional view of an exemplary tube-assembly of a fiber optic cable according to another embodiment of the present invention.

While the bundles of optical fibers may be arranged in various manners, each tube assembly 60 of fiber optic cable 40 can include concentric bundles 42 of optical fibers 44 with some bundles of optical fibers within other bundles of optical fibers as depicted in the embodiment of FIG. 5. In this regard, tube assembly 60 includes an inner bundle 42a of optical fibers 44. Inner bundle 42a includes a plurality of optical fibers 44 and at least one binder thread 48 encircling the plurality of optical fibers to maintain the integrity of the bundle. Although not illustrated, inner bundle 42a may also include a central strength member along which optical fibers 44 extend, if so desired. Inner bundle 42a can include any number of optical fibers 44, but typically includes 6 or 12 optical fibers. Each optical fiber of inner bundle 42a preferably includes indicia, such as a color, for uniquely identifying the respective optical fiber relative to other optical fibers of the inner bundle. While inner bundle 42a may include various binder threads, binder thread 48 of one advantageous embodiment is an air entangled, textured, continuous multi-filament thread as described above in more detail.

Tube assembly 60 of the embodiment depicted in FIG. 5 also includes an outer bundle 42b of optical fibers 44 having a plurality of optical fibers positioned circumferentially about the inner bundle 42a of optical fibers. While outer bundle 42b may include any number of optical fibers, the outer bundle of the illustrated embodiment includes 12 optical fibers. Like inner bundle 42a, each optical fiber 44 of outer bundle 42b also preferably includes indicia, such as a color, for uniquely identifying the respective optical fiber relative to other optical fibers of the outer bundle. While each optical fiber 44 of inner bundle 42a and each optical fiber of the outer bundle 42b is uniquely identified, such as by having a unique color, with respect to other optical fibers of the respective bundle, optical fibers of inner bundle 42a may have the same colors as optical fibers of outer bundle 42b. However, optical fibers 44 of the inner and outer bundles that have the same color may be distinguished from one another based upon the respective bundle in which the optical fibers are included. Outer bundle 42b of optical fibers also includes at least one binder thread 48 encircling the plurality of optical fibers to maintain the integrity of the optical fibers of the outer bundle about inner bundle 42a. While inner bundle 42a may include various binder threads, binder thread 48 of one advantageous embodiment is also an air entangled, textured, continuous multi-filament thread as described above in more detail.

Additionally, tube assembly 60 of FIG. 5 can include a tubular member 56, such as a buffer tube, surrounding outer bundle 42b of optical fibers 44 as described above. Moreover, any voids within tubular member 56 may be filled with a filling compound to inhibit the migration of water, such as disclosed in U.S. patent application Ser. No. 09/322,625 filed May 28, 1999, which is incorporated herein by reference.

As depicted in FIG. 5, at least the outer bundle 42b of optical fibers 44 and, more preferably, both the outer and inner bundles of optical fibers are non-jacketed such that the cross-sectional size of the resulting tube assembly 60 can be minimized for a predetermined number of optical fibers. In order to inhibit adhesion between tubular member 56 and outer bundle 42b of optical fibers 44, tube assembly 60 of FIG. 5 can also include a separation element, such as a separation layer that surrounds the outer bundle of optical fibers or a surface coating on the outer bundle of optical fibers, as described above.

By encircling inner bundle 42a with optical fibers 44 of outer bundle 42b, tube assembly 60 of the embodiment of FIG. 5 will include a dense collection of optical fibers in order to maximize the number of optical fibers included within a buffer tube of a particular cross-sectional size. However, each optical fiber of tube assembly 60 can be uniquely identified by means of the indicia, such as the color, of each optical fiber and the separation of the optical fibers into inner and outer bundles.

In one embodiment, utilizing tube assembly 60, a plurality of tube assemblies are extended alongside a central strength member 46, typically by being stranded about central strength member 46. A cable jacket 50 is then extruded over the plurality of tube assemblies 54. To inhibit adhesion between tubular members 56 of tube assemblies 60 and cable jacket 50, fiber optic cable 40 can also include a separation element disposed between tube assemblies 60 and cable jacket 50 as described above in conjunction with the other embodiments. By including tube assemblies, each of which generally include multiple bundles of optical fibers, fiber optic cable 40 of this embodiment can include even greater numbers of optical fibers, such as 288 optical fibers or more, while continuing to minimize the overall cross-sectional size of the cable. However, each optical fiber 44 of fiber optic cable 40 of this embodiment may be uniquely identified since tubular member 56 of each tube assembly 54 may include indicia, such as a color, to uniquely identify the respective tube assembly and the indicia, such as the color, of each optical fiber and the separation of the optical fibers into inner and outer bundles permit each optical fiber of a respective tube assembly to be uniquely identified as described above.

Figure 6:
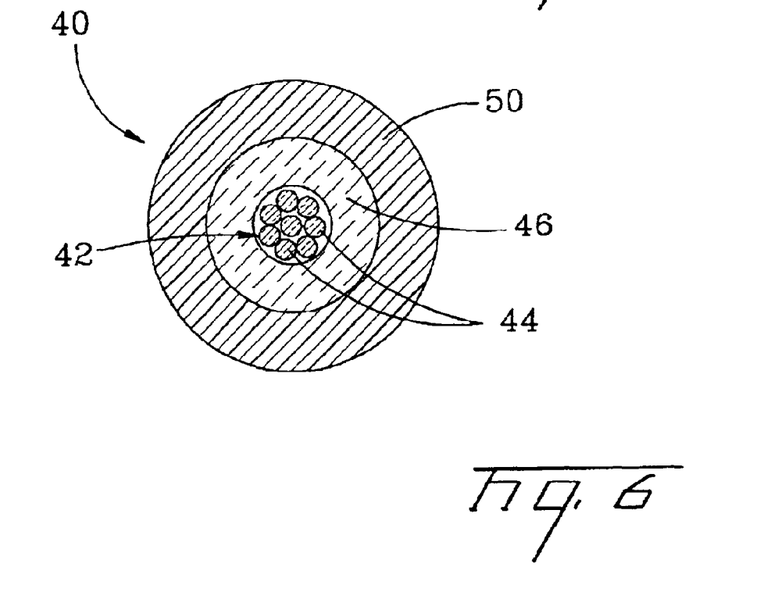
FIG. 6 is a cross-sectional view of an exemplary fiber optic cable according to another embodiment of the present invention.

FIG. 6 depicts fiber optic cable 40 another embodiment of the present invention. Fiber optic cable 40 of FIG. 6 includes cable jacket 50 that generally surrounds strength members 46 such as aramid yarns and bundle 42. Bundle 42 includes a plurality of non-tight buffered optical fibers 44, for example, eight optical fibers held together by binder thread 48 (not shown) that inhibits non-tight buffered optical fibers 44 from being entangled with strength members 46. Fiber optic cable 40 of FIG. 6 has a optical fiber 44 on optical fiber 44 construction among non-tight buffered optical fibers 44; however, optical fibers 44 may include a tight buffer layer. Fiber optic cable may also include a ripcord 54 for facilitating removal of cable jacket 50. Fiber optic cable 40 of FIG. 6 has a generally round cross-section and may be used as an interconnect cable.

Conventional optical fiber ribbon interconnect cables generally include a preferential bend characteristic due to the planar orientation of the optical fibers in the optical fiber ribbon. Consequently, conventional eight-fiber ribbon interconnect cables are difficult to bend and store in tight quarters such as splice trays. Because fiber optic cable 40 has a generally round cross-section it generally does not have a preferential bend characteristic allowing for easier bending and routing in splice trays.

In one embodiment, fiber optic cable 40 of FIG. 6 includes a cable jacket 50 generally surrounding three ends of 2450 denier aramid yarns stranded around a bundle 42 having eight single-mode optical fibers 44 secured by binder thread 48 (not shown) with a cable diameter of about 3 mm or less. However, other configurations may be used and/or the cable diameter may be greater than 3 mm. However, other suitable embodiments may be practiced, for example, a cable jacket 50 generally surrounding four ends of 2450 denier aramid yarns stranded around a bundle 42 having twelve multi-mode optical fibers 44 secured by binder thread 48 with a cable diameter of about 3–4 mm. However, the cable diameter may be greater than 3–4 mm.

Figure 7:
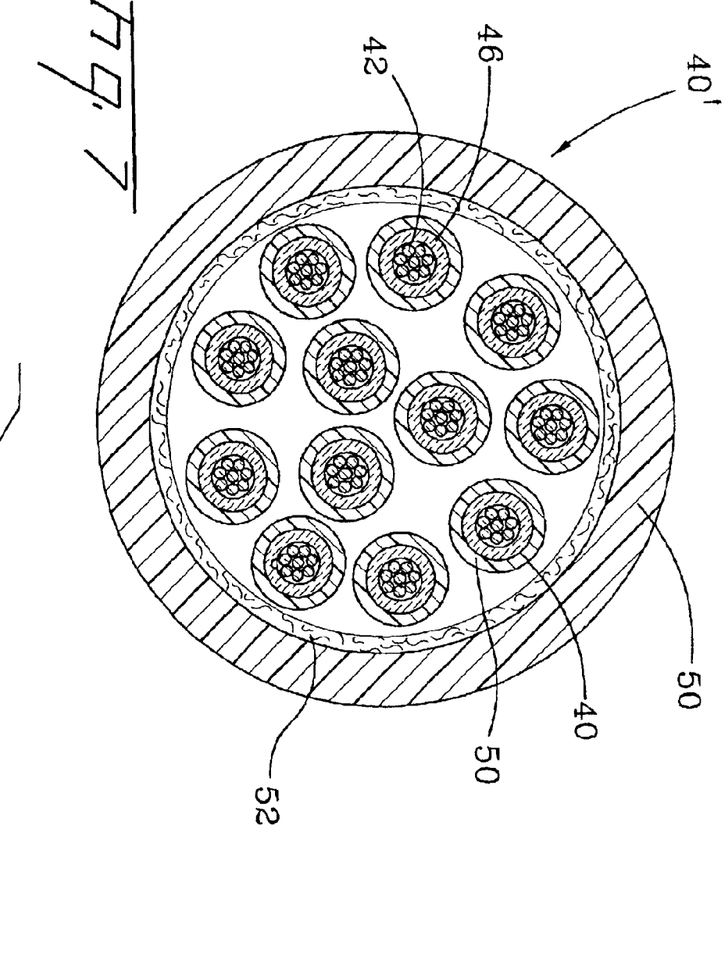
FIG. 7 is a cross-sectional view of an exemplary fiber optic cable according to another embodiment of the present invention.

FIG. 7 depicts fiber optic cable 40' another embodiment of the present invention. The fiber optic cable 40' of FIG. 7 includes a plurality of fiber optic cables 40 of FIG. 6 stranded together forming a breakout cable. Moreover, other suitable cables of the present invention may be constructed as breakout cables. Fiber optic cables 40' includes a first layer having three fiber optic cables 40 helically stranded, a second layer having nine fiber optic cables 40 counter-helically stranded around the first layer, and a cable jacket 50. Embodiments of fiber optic cable 40' may include, for example, a separation layer 52 such as a water blocking tape, a central member, a ripcord, and/or other suitable cable components.

Figure 8:
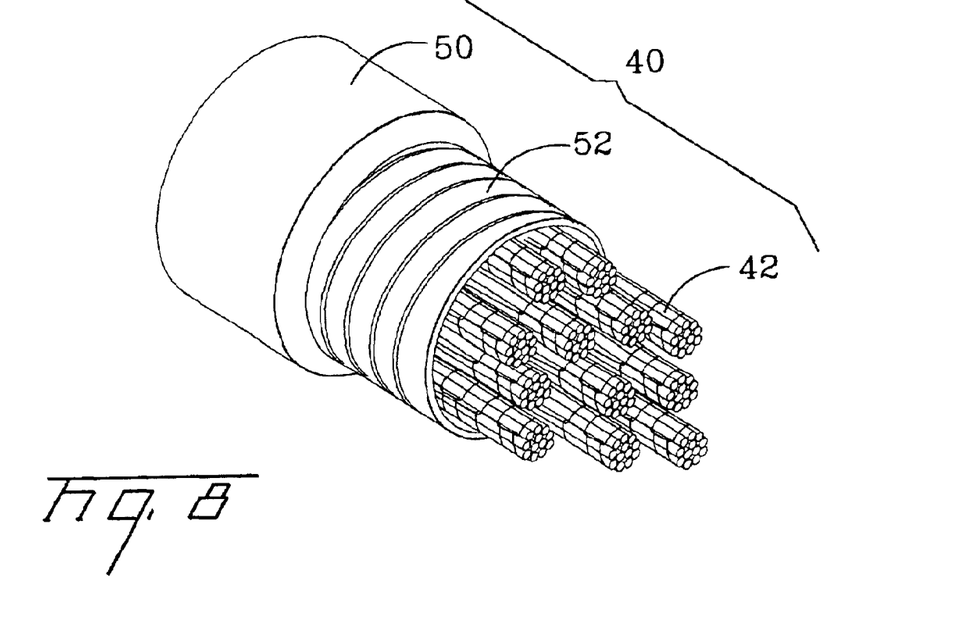
FIG. 8 is a fragmentary perspective view of an exemplary fiber optic cable according to another embodiment of present invention.

FIG. 8 depicts fiber optic cable 40 another embodiment of the present invention. The fiber optic cable 40 of FIG. 8 includes at least one unjacketed bundle 42 of non-tight buffered optical fibers 44 having a binding thread 48 therearound. However, optical fibers 44 may be tight buffered and/or other binding elements may be used. Bundles 42 are stranded together; however, they may be unstranded. More particularly, fiber optic cable 40 includes a first layer having three bundles 42 helically stranded and a second layer having nine bundles 42 counter-helically stranded around the first layer. Separation layer 52 surrounds bundles 42 of fiber optic cable 40 of FIG. 8 and is formed from a flexible armor. The flexible armor preferably includes a smooth inner surface for contacting bundles 42 and/or optical fibers 44. For example, CPID interlock armor available from Eastern Wire & Conduit of Ontario, Canada; however, other suitable armor may be used for separation layer 52. The flexible armor may also provide bend control to fiber optic cable 40 by inhibiting small bend radii that may cause optical attenuation. A cable jacket 50 surrounds the armor separation layer 52 of FIG. 8; however, embodiments of FIG. 8 may be practiced without cable jacket 50.

Additionally, fiber optic cable 40 of FIG. 8 does not include a bundle and/or a cable jacket within separation layer 52; however, embodiments may be practiced with bundle jackets. Eliminating a jacket from individual bundles 42 and/or a jacket around the stranded bundles 42 within the armor separation layer 52 allows for a higher optical fiber packing density within the armor separation layer 52. Embodiments of fiber optic cable 40 of FIG. 8 may include, for example, a central member, a ripcord, a water blocking tape wrapped around the bundles and/or other suitable cable components.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A fiber optic cable comprising:
   at least one bundle, said at least one bundle comprising a plurality of non-tight buffered optical fibers and a binder element;
   said binder element maintaining the plurality of non-tight buffered optical fibers in said at least one bundle;
   a separation layer contacting a portion of said at least one bundle;
   a cable jacket contacting at least a portion of said separation layer, wherein said separation layer inhibits adhesion between said at least one bundle arid said cable jacket; and
   said fiber optic cable excluding a grease or a grease-like composition being in contact with said at least one bundle for filling interstices of the cable thereby blocking water from flowing through the cable.

2. The fiber optic cable according to claim 1, said binder element being selected from a binder thread, a binder yarn, a thin film, arid a tape.

3. The fiber optic cable according to claim 1, said fiber optic cable having 144 non-tight buffered optical fibers with a cable diameter of about 10 mm or less.

4. The fiber optic cable according to claim 1, said plurality of non-tight buffered optical fibers further including a tight buffered layer, and said fiber optic cable having 144 tight buffered optical fibers with a cable diameter of about 20 mm or less.

5. The fiber optic cable according to claim 1, said binder element being a binder thread encirling said plurality of non-tight buffered optical fibers.

6. The fiber optic cable according to claim 1, said separation layer being selected from a fiberglass yarn, an aramid yarn, an armor layer, a water-swellable tape, a thin film, and a soft housing.

7. The fiber optic cable according to claim 1, said separation layer having a tensile strength characteristic.

8. The fiber optic cable according to claim 1, said at least one bundle being stranded around a central member.

9. The fiber optic cable according to claim 1, said fiber optic cable being a portion of a breakout cable.

10. The fiber optic cable according to claim 1, said plurality of non-tight buffered optical fibers further including a tight buffered layer.

11. A fiber optic cable comprising:
    at least one bundle, said bundle comprising a plurality of non-tight buffered optical fibers and at least one binder thread encircling the plurality of optical fibers, thereby maintaining the plurality of optical fibers in the bundle, wherein said at least one binder thread includes a silicone wax emulsion finish;
    a separation layer adjacent to and generally surrounding said at least one bundle;
    a cable jacket contacting at least a portion of said separation layer, wherein said separation layer inhibits adhesion between said at least one bundle and said cable jacket; and
    said fiber optic cable excluding a grease or a grease-like composition being in contact with said at least one bundle for filling interstices of the cable thereby blocking water from flowing through the cable.

12. The fiber optic cable according to claim 11, said at least one binder thread comprises a looper thread and a needle thread that cooperate to encircle the plurality of optical fibers.

13. The fiber optic cable according to claim 12, said looper thread and said needle thread are secured to one another by a plurality of overlocked stiches.

14. The fiber optic cable according to claim 11, said fiber optic cable being a portion of a breakout cable.

15. The fiber optic cable according to claim 11, said plurality of non-tight buffered optical fibers further including a tight buffered layer.

16. A fiber optic cable comprising:
    a central member;
    at least one bundle, said at least one bundle comprising a plurality of non-tight buffered optical fibers and a binder element;
    said binder element maintaining said plurality of non-tight buffered optical fibers in said at least one bundle, wherein said at least one binder element includes a silicone wax emulsion finish;
    a cable jacket surrounding said at least one bundle;
    a separation layer for inhibiting adhesion between said at least one bundle and said cable jacket, wherein said separation layer is adjacent to said at least one bundle; and said fiber optic cable excluding a grease or a grease-like composition being in contact with said at least one bundle for filling interstices of the cable thereby blocking water from flowing through the cable.

17. The fiber optic cable according to claim 16, said binder element being selected from a binder thread, a thin film, and a tape.

18. The fiber optic cable according to claim 16, said binder element being at least one binder thread encirling said plurality of non-tight buffered optical fibers.

19. The fiber optic cable according to claim 18, said at least one binder thread comprises a looper thread and a needle thread that cooperate to encircle the plurality of optical fibers.

20. The fiber optic cable according to claim 19, said looper thread and said needle thread are secured to one another by a plurality of overlocked stiches.

21. The fiber optic cable according to claim 16, said separation layer being selected from a fiberglass yarn, an aramid yarn, an armor layer, a water-swellable tape, a thin film, and a soft housing.

22. The fiber optic cable according to claim 16, said plurality of non-tight buffered optical fibers further including a tight buffered layer.

23. A fiber optic cable comprising:
   at least one bundle, said at least one bundle comprising a plurality of optical fibers and a binder element;
   said binder element maintaining said plurality of optical fibers in said at least one bundle, wherein said binder element includes a silicone wax emulsion finish;
   an armor layer surrounding said at least one bundle, wherein said armor layer is adjacent to said at least one bundle; and
   said fiber optic cable excluding a cable jacket within said armor layer.

24. The fiber optic cable according to claim 23, said plurality of optical fibers being non-tight buffered.

25. The fiber optic cable according to claim 23, said binder element being selected from a binder thread, a binder yarn, a thin film, and a tape.

26. The fiber optic cable according to claim 23, said binder element being a binder thread encirling said plurality of optical fibers.

27. The fiber optic cable according to claim 23, said fiber optic cable further comprising a cable jacket generally surrounding said armor layer.

28. The fiber optic cable according to claim 23, said plurality of optical fibers further including a tight buffered layer.

* * * * *